Jan. 16, 1934.  P. BISCHOF  1,943,809
TAKE-UP DEVICE FOR STRANDED CABLES
Filed Dec. 8, 1932
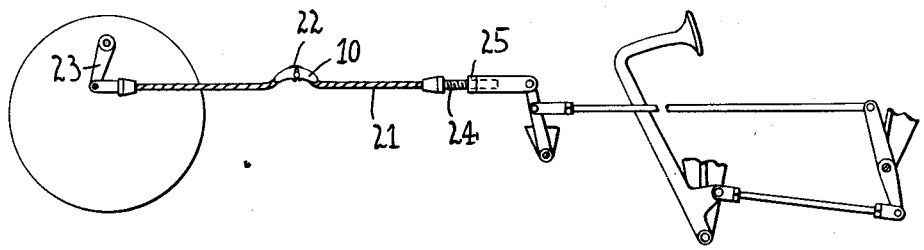
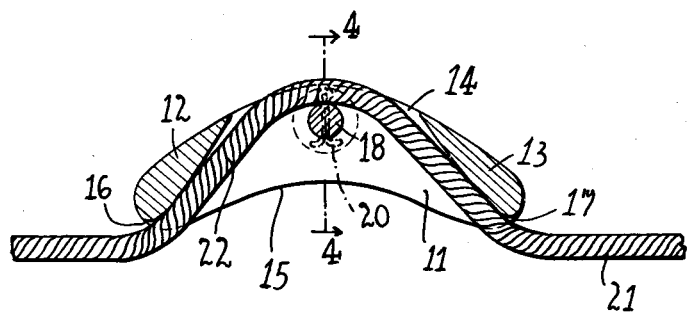
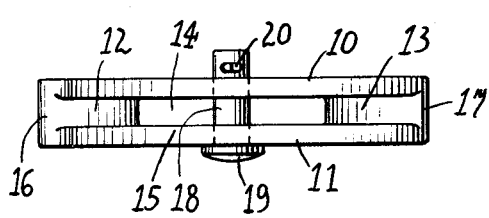
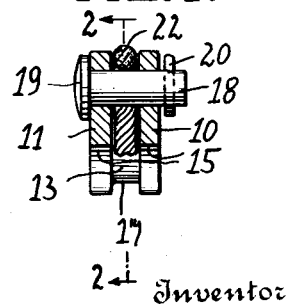
Inventor
PAUL BISCHOF
By his Attorney J. Lederman Patented Jan. 16, 1934

1,943,809

UNITED STATES PATENT OFFICE 1,943,809

TAKE-UP DEVICE FOR STRANDED CABLES

Paul Bischof, New York, N. Y.

Application December 8, 1932. Serial No. 646,349

5 Claims. (Cl. 24—71.1)

The main object of this invention is the provision of a simple take-up device which may be applied on a stranded wire cable such as is commonly used in connection with the brake-actuating mechanism of automobiles. It is well known that after repeated operation of the brakes of an automobile through such cables, the cables eventually stretch, and for that purpose they are provided with a screw and nut take-up device at one or both extremities. In practice, however, the full amount of possible take-up provided by such devices is utilized while the cable is still serviceable, but heretofore it has been necessary to scrap the cable because it could no longer be used as a workable part of the brake mechanism as a result of its excessive length. The device presented by this invention provides means for simply and quickly shortening the effective length of the cable so that the screw and nut take-up arrangement may be set back to where it was when the cable was new, and for a considerable time thereafter the cable may be continued to be shortened by adjustment of the nut on the end of the cable.

Another object of the invention is the provision of a device of the class described which consists primarily of a unitary member having a slot therein through which a loop formed in the cable is passed and having a pin insertable through the walls of the member to retain the loop of the cable in rigid position to prevent straightening of the cable upon the application of tensile force to the cable.

The above and other objects will become apparent in the description below, in which characters of reference refer to like-named parts in the drawing.

Referring briefly to the drawing, Figure 1 is a view illustrating the application of the device to a cable forming part of the brake-actuating mechanism of an automobile.

Figure 2 is an enlarged front elevational view of the device with its front wall removed to show the manner of its application to the cable.

Figure 3 is a bottom plan view of the device.

Figure 4 is a cross-sectional view taken on the line 4—4 of Figure 2.

Referring in detail to the drawing, the numerals 10 and 11 indicate a pair of symmetrical arcuate flat members which form the spaced-apart walls of the device. Mounted at the ends of these members and acting as spacers are a pair of fillers 12 and 13. All of the members so far set forth are formed integral with each other and may be molded or otherwise formed into a unitary device. The fillers 12 and 13 taper upwardly as shown in Figure 2 so that they leave a relatively short slot 14 at the apex of the device, and a relatively long slot 15 at the base, both of these slots communicating with each other. The lower ends of the fillers 12 and 13 are rounded as shown at 16 and 17 to provide smooth surfaces for the contact of the cable 21 therewith.

Near the apex of the device and located midway of the length thereof, a bolt 18 passes transversely through the walls 10 and 11 through holes formed in said walls. This bolt is provided on one end with a head 19 and on the other end with a hole through which a cotter pin 20 is passed. The cable 21, preparatory to mounting the device thereon, is formed into a loop 22 which is inserted into the device from the bottom through the slot 15. When the loop 22 has been drawn into the position shown in Figure 2, the bolt 18 is passed through the walls 10 and 11 and the cotter pin inserted to prevent the bolt from being withdrawn. The device is mounted as set forth while one or both ends of the cable 21 are detached from the rest of the brake-actuating mechanism. After the device has been applied to the cable, the cable is again mounted in position in the brake-actuating mechanism as shown in Figure 1. Thereafter, until the cable has again been stretched to its maximum, take-up of the cable is accomplished by turning the nut 25 down upon the screw 24, the latter being integral with the cable 21. In the illustration in Figure 1, the cable is shown secured to a front wheel brake-actuating crank 23.

It is obvious that by the use of this device the life of such cables may be considerably increased and the cable may, with a very small amount of effort and in a minimum amount of time, be shortened to restore it to its original length. It is also obvious that such a device is inexpensive in cost of manufacture.

Obviously, modifications in form and structure may be made without departing from the spirit and scope of the invention.

I claim:

1. A device of the class described comprising a pair of spaced-apart parallel arcuate walls having a slot passing therethrough, said slot being of greater length on one side of the device than on the other, said walls having aligned holes adjacent the shorter side of the slot communicating with said slot, a bolt insertable through said holes, said slot being adapted to receive the loop of a cable therein with the apex of the loop lying in the shorter of said slots, spacer members mounted between said walls on opposite ends thereof, said spacer members tapering toward the shorter side of said slot.

2. A device of the class described comprising a pair of spaced-apart parallel arcuate walls having a slot passing therethrough, said slot being of greater length on one side of the device than on the other, said walls having aligned holes adjacent the shorter side of the slot communicating with said slot, a bolt insertable through said holes, said slot being adapted to receive the loop of a cable therein with the apex of the loop lying in the shorter of said slots, spacer members mounted between said walls on opposite ends thereof, said spacer members tapering toward the shorter side of said slot, the wider ends of said spacer members being rounded.

3. A device of the class described comprising a pair of spaced-apart parallel arcuate walls having a slot passing therethrough, said walls having aligned holes adjacent the apex of the "arch" formed thereby, a bolt insertable in said holes to bridge said slot, said slot being adapted to receive the loop of a cable therein with the apex of the loop lying against said bolt, and spacer members mounted between said walls on opposite ends thereof.

4. A device of the class described comprising a pair of spaced-apart parallel walls having a slot passing therethrough, said walls having aligned holes extending therethrough substantially midway of the length of said walls, a bolt insertable through said holes, said slot being adapted to receive the loop of a cable therein with the apex of the loop lying against said bolt, and spacer members mounted between said walls on opposite ends thereof.

5. A device of the class described comprising a pair of parallel walls, said walls being mutually spaced apart to provide a slot therebetween, said walls having aligned holes extending therethrough substantially midway of the length of said walls and offset from the center with respect to the width of the walls, a bolt insertable through said holes, said slot being adapted to receive the loop of a cable therein with the apex of the loop lying against said bolt, and spacer members mounted between said walls on opposite ends thereof.

PAUL BISCHOF.